(No Model.)

J. J. HOGAN.
BOILER TUBE EXTENSION COUPLING.

No. 558,905. Patented Apr. 21, 1896.

Attest:
L. Lee.
Edw. F. Kinsey.

Inventor.
John J. Hogan, per
Thos. S. Crane, Atty.

UNITED STATES PATENT OFFICE.

JOHN J. HOGAN, OF MIDDLETOWN, NEW YORK.

BOILER-TUBE EXTENSION-COUPLING.

SPECIFICATION forming part of Letters Patent No. 558,905, dated April 21, 1896.

Application filed September 10, 1895. Serial No. 562,057. (No model.)

*To all whom it may concern:*

Be it known that I, JOHN J. HOGAN, a citizen of the United States, residing at Middletown, Orange county, New York State, have invented certain new and useful Improvements in Boiler-Tube Extension-Couplings, fully described and represented in the following specification and the accompanying drawings, forming a part of the same.

The object of this invention is to furnish a convenient means of extending a boiler-tube for discharging steam or water within a steam or water chamber, in which situation no strain would be imposed upon the tubes to dislodge them from the coupling.

The coupling is very convenient, being destitute of fastenings and secured upon the adjacent ends of the tubes by friction only.

The coupling is formed in one piece, with end sockets adapted to fit the two portions of tube and an intermediate collar to form shoulders for contact with the ends of the tubes.

The sockets in the opposite ends of the coupling are preferably made with a slight taper, so as to be jammed upon the ends of the tubes to secure the same together by friction, and the central collar is made to form a continuation of the bore to avoid any obstruction to the moving fluid.

The coupling may serve to hold the tube ends at any desired angle with one another, in which case the central collar is made with its opposite faces at right angles to the axes of the respective sockets, and is thus formed longer upon one side of the bore than the other.

In the annexed drawings the invention is shown applied to extend the ends of boiler-tubes up to the water-line within a horizontal steam and water drum, such tubes being frequently used in the vertical type of water-tube boilers.

Figure 1:
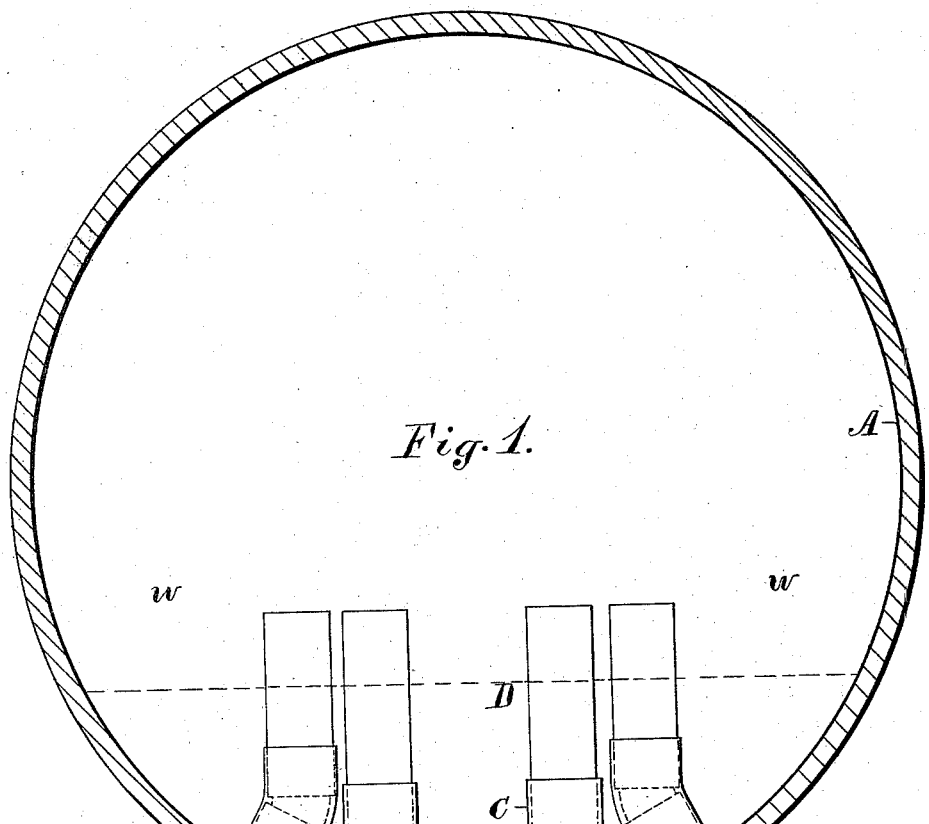
Figure 2:
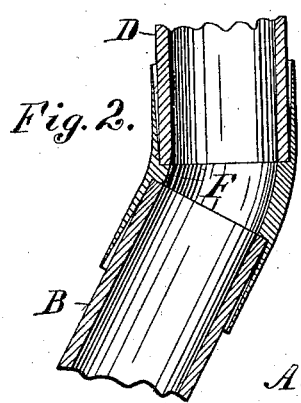
Figure 3:
Figure 4:
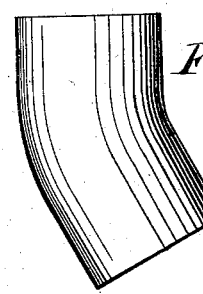

Figure 1 is a transverse section of the drum at the center line of four tubes. Fig. 2 is a central vertical section of one of the couplings with the adjacent tube ends. Fig. 3 shows the socket at one end of the coupling, and Fig. 4 is a side view of the coupling. Figs. 2, 3, and 4 are upon a larger scale than Fig. 1.

A is the shell of the drum, and B and B' the upper ends of four water-tubes which are extended in the tube-openings of the shell. The tubes enter the shell radially and the couplings C are employed to support extension-pipes upon the ends of the tubes, so as to deliver the steam and water at the desired height within the drum—as, for instance, above the water-level represented by the dotted line *w w*. The radial ends of the water-tubes penetrate the shell at various angles with the vertical line, and it would be difficult in practice to apply an expanding-tool to the upper ends of such water-tubes if they were bent, before insertion in the shell, to extend vertically upward to the water-line. By terminating the water-tubes a short distance inside the shell the couplings may be readily applied thereto and may be made with angles corresponding to the inclination of such tubes, so as to support the extensions D vertically. The outer tubes B B are therefore shown with couplings having sockets at a greater angle than the inner tubes B' B'.

One of the couplings for the outer tube B is shown in section in Fig. 2, with the sockets upon the ends tapered internally, so as to readily admit the ends of the tubes.

A central collar F, having the same bore as the tubes, is shown within the middle of the coupling, with its faces inclined to one another to fit the ends of the tubes, and the collar upon the outer side of the curve is thus longer than upon the inner side, as is clearly shown in Fig. 2.

The entire construction is readily adapted for casting of any malleable metal and constitutes an extension-coupling, which may be readily jammed upon the inner end of the boiler-tubes by driving it into its place by a mallet or hammer.

The extension-pipes D are secured within the couplings by friction, and may be secured within the coupling at the same time that the coupling is attached to the boiler-tube by fitting the coupling and extension-pipe both into their places and applying the mallet or hammer to the top of the extension-pipe.

The extension pipe or coupling can be detached when desired by jamming it loose.

The tapering form of the socket adapts a rough casting to fit upon the end of the tube and facilitates the driving of the coupling upon the tube by the method described.

By making the parts to fit suitably the friction suffices to hold the couplings upon the ends of the boiler-tubes and the extensions D firmly in their places.

I am well aware that double hub-couplings adapted to secure gas and water pipes together with a lead packing have been formed with an internal collar at the middle of their length; but in such cases the central collar does not serve as a driving-stop, as the coupling is not secured upon the pipe by friction, as in my construction, and is not driven upon the end of the pipe by a mallet, as intended in my invention. To fit my coupling to the ends of the pipe, it requires no socket or recess of any kind to retain a packing; but the bore of the socket is extended continuously from the collar to the outer end without any enlargement whatever. For convenience of manufacture the taper also may be extended continuously from the outer end to the collar, as shown in Fig. 2 of the drawings.

I am aware that couplings have been formed with sockets at various angles with one another, and do not therefore claim a mere angle-coupling; but

What I claim, and desire to secure by Letters Patent, is—

1. The combination, with a steam-drum, and boiler-tubes projected through the bottom of the same to attach a coupling, of extension-couplings C with friction-sockets applied to such boiler-tubes adjacent to the shell of the drum, and extension-pipes D secured by friction in such couplings and projected upward, as and for the purpose set forth.

2. An extension-coupling for boiler-tubes, adapted for use without fastening to the tubes, and having the continuously-tapered end sockets formed at an inclination to one another, and the internal collar F of the same bore as the tubes and longer upon one side than the other, to set its faces at right angles to the axes of the sockets, substantially as herein set forth.

In testimony whereof I have hereunto set my hand in the presence of two subscribing witnesses.

JOHN J. HOGAN.

Witnesses:
L. LEE,
EDW. F. KINSEY.